United States Patent [19]

Glen et al.

[11] Patent Number: 4,927,406
[45] Date of Patent: May 22, 1990

[54] SPRING BIASED DRIVE SOCKET INSERT FOR CENTRIFUGE ROTORS

[75] Inventors: Stefan J. Glen, Palo Alto; William E. Ellison, San Mateo, both of Calif.

[73] Assignee: Beckman Instruments, Inc., Fullerton, Calif.

[21] Appl. No.: 284,974

[22] Filed: Dec. 15, 1988

[51] Int. Cl.⁵ .............................................. B04B 9/00
[52] U.S. Cl. ......................................... 494/84; 494/16
[58] Field of Search ..................... 494/85, 84, 16, 17, 494/20, 83, 82, 81; 210/360.1, 781, 782

[56] References Cited

U.S. PATENT DOCUMENTS

| | | | |
|---|---|---|---|
| 2,827,229 | 3/1958 | Blum | 494/84 |
| 4,790,808 | 12/1988 | Piramoon | 494/16 |
| 4,824,429 | 4/1989 | Keunen | 494/16 |
| 4,832,678 | 5/1989 | Sheeran | 494/16 |

*Primary Examiner*—Robert W. Jenkins
*Attorney, Agent, or Firm*—William H. May; Paul R. Harder

[57] ABSTRACT

A composite rotor body has a drive hole insert attached. The drive hole insert seats along a conical surface. A disk spring bears against a washer, which in turn bears against the top surface of the composite material rotor body. The preloaded disk spring compresses the conic surface of the rotor body against the mating surface of the drive hole insert. The preload within the disk spring is activate by torquing centering nut until the disk spring is essentially flat. The centering nut captures and centers both the disk spring and washer within a counterbored recess on its bottom face. The contact surface is treated with a form of dry lubricant or release agent, typically particulate Teflon, such that axial translation is facilitated. The disk spring is sized such that the drive hole insert translates axially without rotation along the surface and, effectively, maintains constant in-plane orientation with respect to the rotor body. This occurs as the diameter of the through-the-thickness hole in the rotor body expands and contracts due to operational loads.

7 Claims, 4 Drawing Sheets

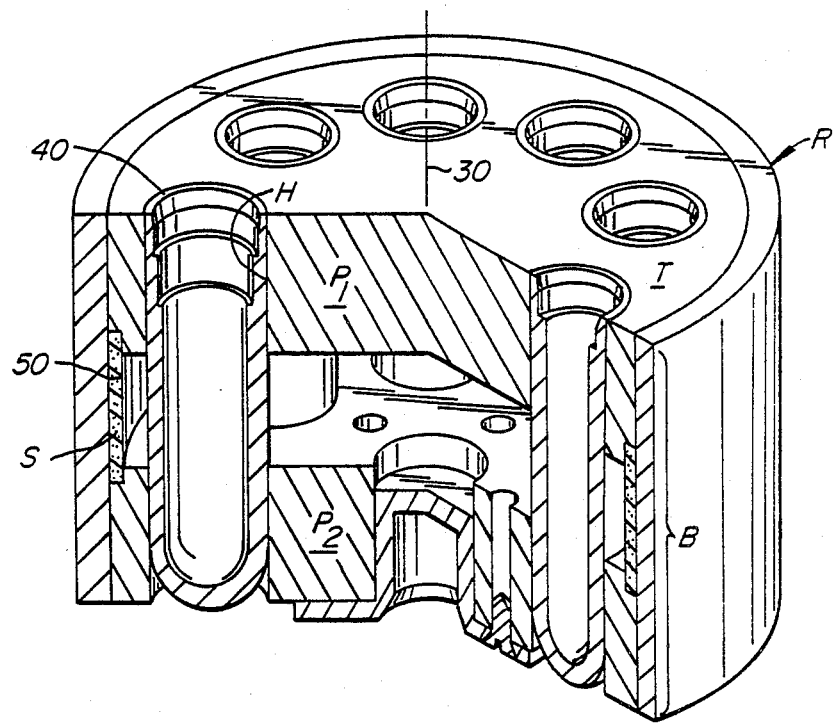
FIG._1. PRIOR ART
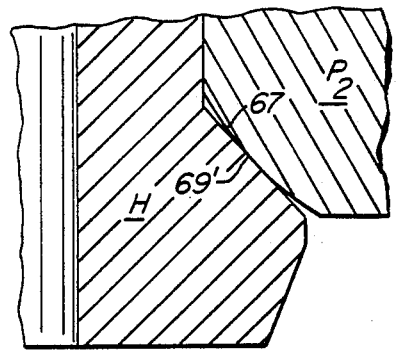
FIG._2B.
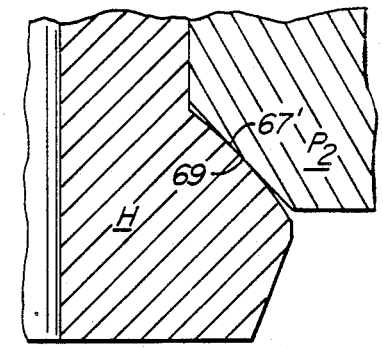
FIG._2C.

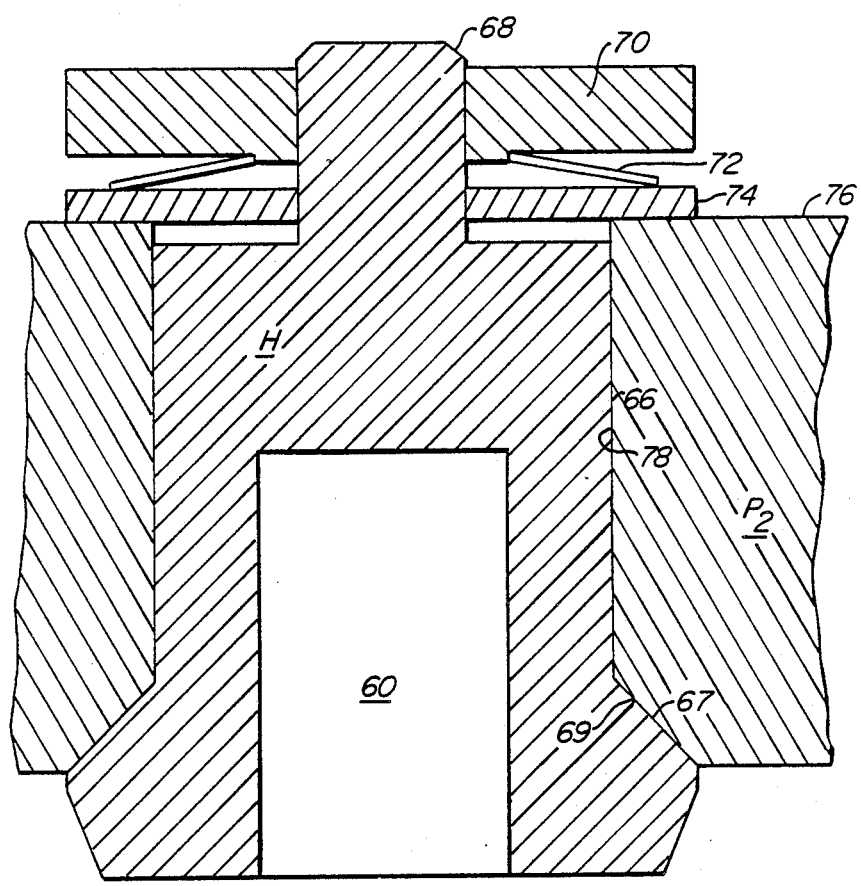
FIG._2A.

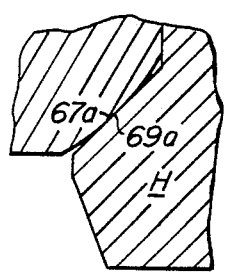
FIG._2D.
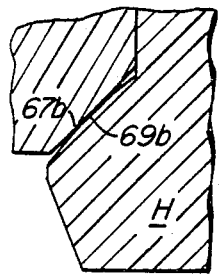
FIG._2E.
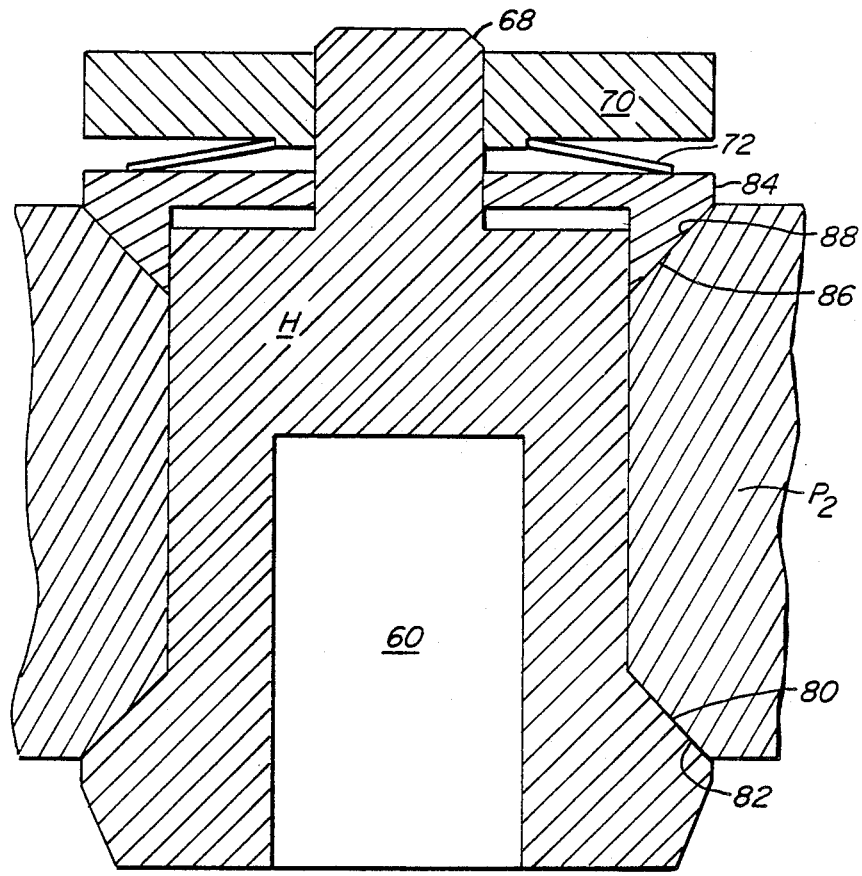
FIG._3A.

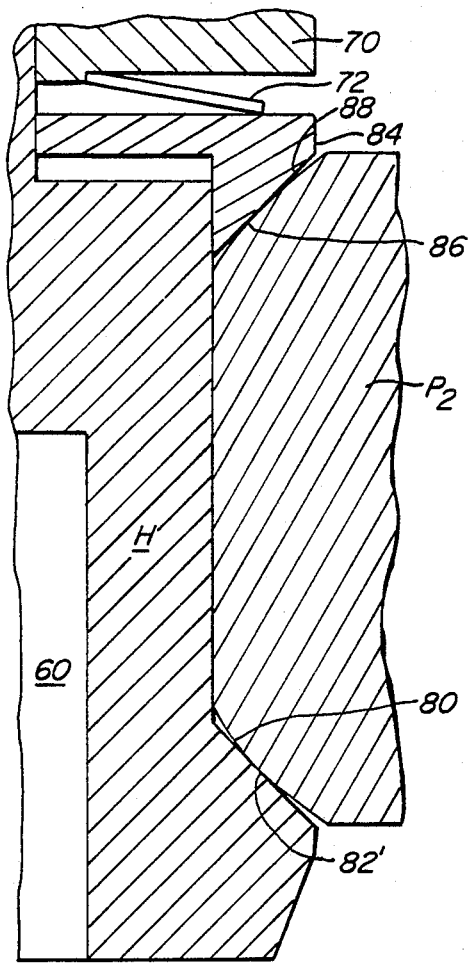 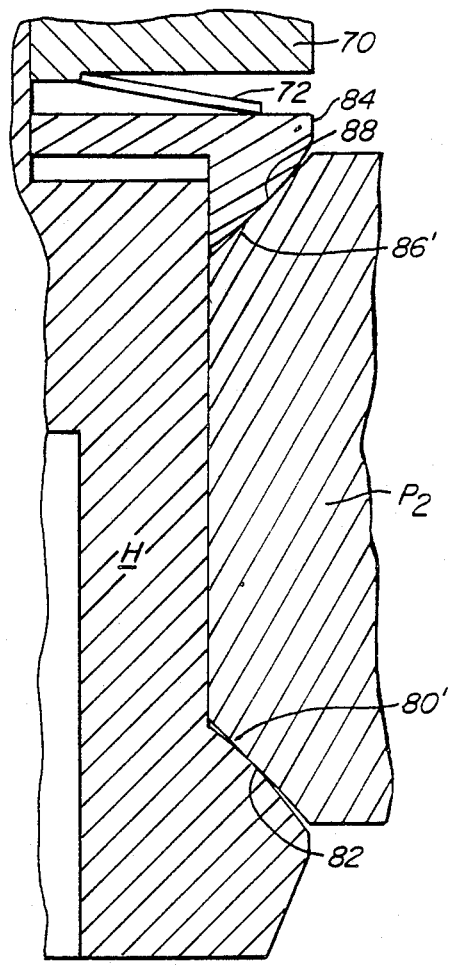
FIG._3B.  FIG._3C.

SPRING BIASED DRIVE SOCKET INSERT FOR CENTRIFUGE ROTORS

This invention relates to centrifuge rotors. More particularly, an apparatus and method of attaching a rotor drive hub socket to a composite material rotor body is disclosed for resisting dynamic forces imposed by centrifugation.

BACKGROUND OF THE INVENTION

Centrifuge rotors are fabricated from composite materials such as carbon fibers and carbon filaments, as well as with other fiber materials, bound into a suitable form with a polymerized synthetic resin. The selection of the fiber material, bound with the synthetic resin, is based on an exploitation of several unique physical properties of the fibers. For the application to centrifuge rotors, the most valuable physical property of any rotor construction material is a high strength to weight ratio. A second important property is high modulus of elasticity. A third desirable property is relatively low density. Composite structures, including centrifuge rotors, have been made with a number of different fiber materials such as glass filaments, boron filaments, synthetic organic fibers such as Dacron, and with various types of carbon fibers and carbon monofilaments. In general, the various forms of carbon fibers and filaments provide the most desirable combination of the above-mentioned properties for use in the construction of centrifuge rotors.

A rotor properly designed to exploit the above three properties will have an advantage over conventional metal rotors (usually aluminum or titanium alloys) in that, due to the high strength to weight ratio, there will be less centrifugally induced self stress and more of the material of the rotor is applied to supporting the centrifugal loads due to the samples which are being centrifuged. The high modulus of elasticity allows the composite (carbon fibers with the resin binder) to approach or match the modulus of metal parts which must be assembled to the rotor and to not deform excessively under centrifugal loads. Finally, the low density coupled with the high strength to weight ratio allows the design, for equivalent sample handling capacity, to be significantly lighter than metal rotors. This later advantage is particularly important for large volume rotors, which can be too heavy for a small lab technician to lift. At the same time, drive bearing life will markedly extended as rotor weight is reduced.

A further property of composite type materials and structures which has been exploited in centrifuge rotor and other composite structure design is the rather considerable possibility to orient the fibers in the composite so that they provide strength where it is needed. In metal construction, except for a moderate amount of anisotropic, properties which may be established by forging or selective heat treatment, the material has the same properties in all directions (isotropic) whether needed or not! Thus, as in U.S. Pat. No. 4,781,699 to A. Piramoon, a composite rotor is disclosed in which parts of the rotor are in the form of disks made up of multiple layers of monodirectional carbon fiber tape stacked and oriented so as to vary the angle of successive layers in increments of 45° and bound together with a suitable resin. The object being to provide high strength at every direction in the plane of the disk but with strength normal to the plane only that due to the binding risin.

The second composite material in this rotor construction consists of an outer ring of continuous fibers which are oriented primarily to provide hoop strength to give further support to the rotor is resisting the load due to the samples and sample holders.

Unfortunately, the design of composite material rotors is not without some special difficulties. One serious difficulty arises from the microphysical characteristics of the composite materials. Specifically, where it is necessary to provide a machined interface between composite and metal part, the surface characteristics of the composite requires quite special consideration. An examination of such a machined surface, even when finished by precision diamond grinding methods, reveals carbon fibers cut through at various angles, very large local variations in fiber versus binder areas and a considerable amount of imbedded ground fiber debris. It is quite apparent that this surface is not at all well suited to any sort of highly localized load bearing. It is, even with careful design measures taken to spread the load, very far from an ideal surface for the transmission of forces through frictional engagement or for withstanding highly oscillating and transient pulse loading. Because of these considerations, it has always been recognized that the conventional centrifuge drive hub socket, used with metal rotors, was not suitable for the composite materials. While it would be entirely feasible to machine the composite material, such as that of the lower disk of the above mentioned U.S. patent, to the same drive socket dimensions as used in an equivalent metal rotor; it is probable that the precision bore of the drive socket would be worn to an unacceptable degree after a very few cycles. The means for overcoming this problem has been to provide a metal drive hole so that the composite material machined interface is not subjected to the wear associated with the rotor drive hole. In the Piramoon patent the metal insert was designed to have an interference fit of approximately 0.0035" on diameter at room temperature and it was recognized that the interference would be as little as 0.0005" with the loaded rotor at 60,000 rpm. This interference fit was obtained by thermal shrinking of the insert in liquid nitrogen, installing it in the precision hole provided in the composite plate and allowing it to equilibrate to room temperature providing an expansion fit. In practice it has turned out that an interference fit of the needed dimensions in a composite material is difficult to make to the required reliability. This problem has been observed as a tendency for the insert to gradually shift its location by turning with respect to the rotor body and, eventually shifting so that the rotor becomes unbalanced. Clearly the interference fit between insert and rotor has been lost at running speed. Attempts to overcome this problem by providing pins against relative rotation have been partially successful. Even with the pins against rotation it is clear that there can be a certain amount of "working" on the diameter between the composite and the insert. It is well known that this sort of working at a frictional interface in a rotating system provides additional damping which, in turn, lowers the speed margin against the onset of high speed precession. Once this precession has started the working at the interface will progress rather rapidly and, in the instance of the rather fragile composite surface, can be expected to not only generate considerable local damage but, due to the changed surface and debris at the interface, rapidly increase the damping.

SUMMARY OF THE INVENTION

A composite rotor body has a drive hole insert attached. The drive hole insert seats along a conical surface. A disk spring bears against a washer, which in turn bears against the top surface of the composite material rotor body. The preloaded disk spring compresses the conic surface of the rotor body against the mating surface of the drive hole insert. The preload within the disk spring is activated by torquing a centering nut until the disk spring is essentially flat. The centering nut captures and centers both the disk spring and washer within a counterbored recess on its bottom face. The contact surface is treated with a form of dry lubricant or release agent, typically particulate Teflon, such that axial translation is facilitated. The disk spring is sized such that the drive hole insert translates axially without rotation along surface and, effectively, maintains constant in-plane orientation with respect to the rotor body. This occurs as the diameter of the through-the-thickness hole in the rotor body expands and contracts due to operational loads.

Basic to the concept of the present invention is the recognition of the nature of a machined bore and other machined surfaces in composite materials. Such materials are not suited to interference fits under dynamic conditions where performance is dependent on the temporal stability of the machined surface. In short, under dynamic conditions it is expected that there will be more or less continuous changes in both the surface and the geometry of any part-to-part interface.

It will be noted that in the embodiment illustrated in FIG. 2A, the frustoconical surface of the insert is forced constantly against the mating surface provided in the composite plate. As the rotor is brought up to speed it is clear that there will be a local surface motion of the conical fit due to the composite disk expanding radially under centrifugal load. It is also evident that when the centrifuge is brought to a stop there will be a corresponding local motion of the composite disk in the centripital direction. Over time it is certain that there will be some wear on both parts of this interface. However, the nature of the wear is such that it will not defeat the self-centering effect of this feature of the design. The disk spring is of a size and force range sufficient to compensate for both the inevitable wear at this interface and any similar wear at the loading washer composite interface.

It is also important, in the execution of the designs incorporating the concept of this invention, to minimize the possible introduction of significant frictional damping which could lead to problems of precession and accelerated damage both to rotor and to centrifuge drive. For example, if the disk spring is not strong enough or it has not been assembled with a high enough clamping force there might be too easy sliding of the loading washer or even the disk spring across the washer.

In short, properly carried out this invention provides a drive hole insert for a composite rotor that is self-centering, accommodates an expected long term wear at the interface and introduces a minimum of frictional damping.

OTHER OBJECTS, FEATURES AND ADVANTAGES

An object of this invention is to provide in a composite material rotor a drive hole socket formed from a more durable impact resistant material than the composite material itself. Accordingly, a drive hole insert is disclosed which is formed of metal rather then the easily worn fiber reinforced plastics.

An advantage of the disclosed construction is that it can be adapted to composite material rotors of virtually all different configurations.

A further advantage of the disclosed construction is that the thermal expansion interference fits and their accompanying requirements for close dimensional tolerances are eliminated.

A further advantage of the drive hole socket insert is that the design of the insert and its attachment to the rotor body do not effectively limit the speed of the rotor.

A further object of this invention is to disclose a Belvelle spring for loading of the drive hole insert onto the composite fiber main body of the rotor. The combination of the Belvelle spring and the essentially conical mating surfaces forms a frictional antitwist interlock between the drive hole insert an the rotor body. This interlock resists acceleration and deceleration torques.

An advantage of the design is that it eliminates the need for traditional mechanical pinning. Such mechanical pinnings can be a potential source of stress intensification both to the rotor body and the drive hole insert.

A further advantage of the disclosed design is that the assembly occurs in simplified steps. Complex steps such as cooling of the insert for a thermal expansion interference fit is not required.

Yet another advantage is that the tolerances of the disclosed dimensions used with the joining of the drive hole insert to the rotor body are simplified. Exacting, precision measurements are not required.

A further advantage is that all configurations of the composite material rotor body are simple. For example, the configuration of complex surfaces, such as screw threads, in the composite material is not required.

BRIEF DESCRIPTION OF THE DRAWINGS

Other objects, features and advantages of this invention will become more apparent after referring to the following specification and attached drawings in which:

FIG. 1 is a configuration of a prior art composite rotor illustrating a drive hub socket attached by mechanical and/or thermal expansion interference fit;

FIG. 2A is a section of the rotor body of FIG. 1 illustrating the substitution of a drive hub socket in accordance with this invention;

FIG. 2B is a section between the drive hub socket on one hand and rotor body on the other hand illustrating a conical surface having a convex surface configured in the rotor body;

FIG. 2C is a similar section of the rotor drive hub socket at the rotor body with the rotor drive hub socket shown having a convex surface;

FIG. 2D is a similar section of the rotor drive hub socket at the rotor convex surface on the drive hub socket and concave surface on the rotor body forming mating surfaces;

FIG. 2E is a similar section of the rotor drive hub socket at the rotor body with paired concave surface on the drive hub socket and convex surface on the rotor body forming the mating surfaces;

FIG. 3A is an alternate design of the drive hub socket for the rotor of FIG. 1, the drive hub socket here illustrated as having paired opposing and mating conical surfaces configured at the bottom of the drive hub and the top of the drive hub;

FIG. 3B is a detail similar to FIG. 3A with the conical surfaces of the rotor body configured with convex curvatures; and, FIG. 3C is a detail of the drive hub and rotor body in FIG. 3A with the top and bottom conical surfaces of the drive hub with convex curvature.

Referring to FIG. 1 a typical rotor of the prior art is illustrated. The rotor includes a first plate, P1, and a second plate P2.

The reader will understand that the rotor here illustrated is a so-called composite material rotor symmetrically formed about a spin axis 30. Typically, plates P1, P2 constitute many separate layers of resin impregnated carbon fiber. These layers of resin impregnated carbon fiber are pressed together under great force and cured. Thereafter, the plates are milled to have the illustrated apertures for receiving the drive hub sockets and other apertures necessary for the composite rotor construction.

In the case of plates P1 and P2, the fibers are aligned in parallel relation with respect to a radius taken normal to the spin axis 30 of the rotor.

Typically, an outer winding B is wound about the two plates P1 and P2 and placed under hoop tension. This hoop tension disposes carbon fibers circumferentially around the plates P1 and P2. Typically, the hoop tension exerts a radially compressive force on the plates P1 and P2.

Typically the upper plate P1 and the lower plate P2 are provided with a series of apertures T which can contain the canisters 40 for the separation of material, such as the classification of sample. As is conventional in all such rotors, the rotor bodies and the containing apertures are symmetrically constructed with respect to spin axis 30. Typically tube inserts T are placed within milled holes H so that sample can be classified during rotor rotation.

It will be understood that where a composite rotor construction is used, plates, such as plates P1 and winding B, have anisotropic strength of material properties relative to the spin axis 30. The material have high stiffness and tensile strength normal to the spin axis 30. These materials do not have the same high stiffness and tensile strength properties parallel to spin axis 30. In fact, the materials are relatively weak in tensile strength along planes parallel to the axis of rotation.

Such a composite material rotor as illustrated in FIG. 1 has properties which impart an improved rotor construction. These properties have been previously discussed and will not be further set forth here.

With reference to FIG. 1 and in the prior art, a carefully drilled cylindrical hole 60 was machined within the composite rotor disk P2. Thereafter, a mating cylindrical drive hub socket 62 having a surrounding lower annular flange 64 was placed in an expansion fit into the milled aperture 60. Typically, such an expansion fit includes immersing the metallic drive hub, which was preferably of titanium but could alternately be of aluminum or stainless steel, into liquid nitrogen. Such immersion cooled the drive hub socket and shrunk the drive hub socket.

Once the drive hub socket was shrunk, it was placed within the rotor body and allowed to equilibrate to the temperature of the normal environment. This fitting produced a thermal expansion interference fit. The advantages and disadvantages of such a thermal expansion interference fit have been heretofore carefully set forth. Accordingly, they will not be further discussed herein. It will suffice to say that this fit of the drive hub socket to the rotor body has severe limitations.

Referring to FIG. 2A, a drive hub socket H placed within plate P2 of the rotor of FIG. 1 is illustrated. This drive hub socket defines a central aperture 60 which central aperture is configured for mating with the drive hub of a centrifuge, this drive hub being mounted on the end of a spindle shaft typically protruding upwardly from a centrifuge (neither being shown). Since a particular configuration of such a mating fit is not the subject matter of this invention, the aperture for the drive hub is shown as an ordinary cylindrical aperture.

The exterior of the drive hub includes a cylindrical surface 62, a lower male conical surface 67 and an extending boss 68. Conical surface 67 configured at the lower portion of drive hub socket H mates with a female conical surface 69 configured at the lower end of the drive hub.

Boss 68 has attached thereto either by swaging or by preferred threading a cap 70. Cap 70 compresses a Belvelle spring 72 onto a compression ring 74 about threaded boss 68. A Belvelle washer capturing annulus is provided in cap 70. Compression rings bears with great force on the upper flat surface 76 of plate P2. Accordingly, it urges the male conical surface 69 at the lower end of the drive hub socket H onto the female conical surface 67 of plate P2 with a corresponding great force.

It can be seen that the slope of the respective conical surfaces is here at a preferred angle of 45°. We prefer such slopes to be at least 30° from the horizontal. Slopes from 30° from the horizontal produce two functions.

First, it will be understood that Belvelle washer 72 exerts a relatively great spring force. In a rotor such as that illustrated in FIG. 1, total rotor weight is on the order of 11 lbs. Typically, the Belvelle spring 72 exerts a spring force in the range of 500 to 700 lbs.

Under such a compressive mating force, the interface between the male conical surface 67 on the drive hub socket H and the female conical surface 69 of plate P2 has two conforming characteristics.

First, the taper and interface between the conical surfaces is not self-locking. The conical surfaces are free to relatively move one with respect to another as the rotor undergoes differential expansion relative to the drive hub.

Second, drive hub socket H is relatively self-centering with respect to the cylindrical aperture 78 in plate P2 into which it is placed. This self-centering action occurs upon relative movement of the male conical surface 69 relative to the female conical surface 67.

It is preferred that the conical surface 67, 69 be treated with a form of dry lubricant or release agent, typically particulate Teflon. Axial translation with such lubricant is facilitated.

In describing the surfaces herein set forth, applicant will use the term substantially conical. This term is utilized to cover convex and concave contours of the side elevations of the cones between the drive hub H and the plate P. While such shapes depart from the precise definition of cones, the vagaries of this invention require usage of the term "substantially conical."

Referring to FIG. 2B, an embodiment is illustrated wherein the male conical surface 67 is mated to a female conical surface 69, this conical surface 69 defining a convex section at the female conical surface on plate P2.

Such a surface assures a conforming contact, which conforming contact cannot occur at a corner of the mated surfaces and occurs at the center of the mated surfaces. Corner contact can degrade the composite material construction and is not stable for the required self-centering fit.

Referring to FIG. 2C, the linear male concave surface 69 is shown mated to a male concave surface 67' having a convex section.

Referring to FIG. 2D, a convex section 69a is illustrated on drive hub socket H and a concave section 69a is illustrated on the rotor body P2. It is preferred that the convex section of the rotor body have a slightly greater radius of curvature. This slightly greater radius enables a central contact away from the corners to occur.

Likewise, and referring to FIG. 2E, a concave section 69b is illustrated on drive hub socket H and a convex section 69b is illustrated on the rotor body P2. It is again preferred that the convex section of the drive hub socket have a slightly greater radius of curvature. This slightly greater radius enables a central contact away from the corners to occur. Further variations can be made by the skilled designer.

Referring to FIG. 3A, a variation of the disclosed invention is set forth. A drive hub H with a central aperture 60 is provided with a lower male conical surface 80. Lower conical surface 80 mates with a female conical surface 82.

The bearing plate 84 has had its construction changed. Specifically, male bearing plate 84 defines a male conical surface 86. Male conical surface 86 bears down on a female conical surface 88 configured in the upper portion of plate P2.

As before, a central boss 68 having a cap 70 rigidly attached thereto compresses a Belvelle washer 72 with great force.

In the embodiment of FIG. 3A, the male conical surface 80 at the lower portion of hub H compresses onto the female conical surface 80. Likewise, the male surface 86 defined in compression ring 84 compresses onto the female conical surface 88 at the upper portion of plate P2.

Referring to FIG. 3B, a variation similar to that illustrated in FIG. 2B is set forth. Specifically, a convex sectioned female conical surface 82' and 88' at the respective bottom and top of plate P2 mate with linear male conical surface 80, 86.

Likewise, and with respect to FIG. 3C, the convex section of the conical surface is reversed. Specifically, male conical surfaces 80' and 86' at the respective bottom and top of the drive hub assembly H have convex section and mate with linear conical surfaces 82, 88.

The reader will understand that the embodiments illustrated with respect to FIGS. 3B and 3C will admit of a number of variations. For example, plate P2 could contain one convex conical surface and a linear surface. Likewise, respective mating surfaces could all be configured in the drive hub for matching a convex conical surface to a linear conical surface. Other similar variations are possible.

As has herein been illustrated, the reader will understand this invention will admit of a number of embodiments. For example, the attached compression of a spring member urging the conical surfaces between the drive hub and rotor can be changed to any number of specific embodiments. For example, although we have illustrated a threaded cap herein, it can be swaged, supplied with keys or provided with other forms of attachment.

In short, any suitable means for spring compression and means for attachment to the hub may be utilized.

We claim:

1. In a centrifuge rotor having a rotor body and a drive hub socket, the rotor construction comprising;
    a rotor body, said rotor body fabricated of a composite material and symmetrically formed with respect to a spin axis of said rotor and defining at least one aperture for receiving materials to be separated;
    at least one substantially conical aperture concentric to the spin axis of said rotor defined in said rotor body for receiving a rotor drive hub socket to said rotor body;
    a rotor drive hub socket, said rotor drive hub socket defining an aperture for mating to the centrifuge drive hub for rotating said rotor body through said spindle, said aperture concentric to the spin axis of said rotor as defined through said drive hub socket;
    said rotor drive hub socket further defining a substantially conical mating surface to the substantially conical aperture of said rotor body; said mating surface defined on the exterior of said rotor drive hub socket for forming contact with the substantially conical aperture of said rotor body, said mating surface concentric to the spin axis of said rotor; and
    spring means operatively connecting said drive hub socket and said rotor body for urging said substantially conical surfaces into contact during the spinning of said rotor, said substantially conical surface given a respective slope to prevent self-locking upon relative movement between said rotor body and drive hub socket and to permit dynamic self-centering sliding contact at said substantially conical surfaces during dynamic differential expansion of said apertures one with respect to another.

2. The invention of claim 1 and wherein said drive hub socket defines at least one mating conical surface.

3. The invention of claim 2 and wherein one of said conical surfaces is provided with a convex section.

4. The invention of claim 1 and wherein said rotor body defines a first pair of opposed conical surfaces, said rotor drive hub socket defines a second pair of opposed conical surfaces and said spring means urges said conical surfaces on said drive hub socket towards the conical surfaces on said rotor body in sliding self-centering engagement.

5. The invention of claim 4 and wherein said rotor body and drive hub socket at said mating surfaces are provided with a lubricant.

6. The invention of claim 1 and wherein said rotor body defines at least one female conical surface, and said drive hub forms at least one mating male conical surface.

7. In a centrifuge rotor having a rotor body with a separately formed central drive hub socket, the rotor construction comprising;
    a rotor body, said rotor body symmetrically formed with respect to a spin axis of said rotor and defining at least one aperture for receiving materials to be separated;
    said rotor body constructed of a composite material having anisotropic properties of increased tensile strength normal to the spin axis of said rotor, said material including resin impregnated fiber;

at least one conical aperture concentric to the spin axis of said rotor defined in said rotor body for receiving a rotor drive hub to said rotor body;

a rotor drive hub socket, said rotor drive hub socket defining an aperture for mating to the centrifuge spindle at a drive hub of a centrifuge for rotating said rotor body through said spindle at said drive hub, said aperture concentric to the spin axis of said rotor as defined through said drive hub socket;

said rotor drive hub socket further defining a substantially conical mating surface to the substantially conical aperture of said rotor body, said mating surface defined on the exterior of said rotor drive hub socket for forming contact with the substantially conical aperture of said rotor body, said mating surface concentric to the spin axis of said rotor; and, spring means operatively connecting said drive hub socket and said rotor body for urging said substantially conical surface and mating surface into contact during the spinning of said rotor, said substantially conical surface given a respective slope to prevent self-locking of said surfaces upon relative movement and to permit dynamic self-centering sliding contact at said conical surfaces during dynamic differential expansion of said surfaces one with respect to another during spinning of said rotor.

* * * * *